United States Patent Office 2,787,546
Patented Apr. 2, 1957

2,787,546

LIGHT-SENSITIVE PHOTOGRAPHIC ELEMENTS FOR PHOTOMECHANICAL PROCESSES

Albert C. Smith, Jr., Donald A. Smith, and Cornelius C. Unruh, Rochester, N. Y., assignors to Eastman Kodak Company, Rochester, N. Y., a corporation of New Jersey No Drawing. Application February 8, 1955,
Serial No. 486,971

5 Claims. (Cl. 96—115)

This invention relates to photographic elements comprising a support carrying a layer of a polyvinyl acetal containing recurring vinyl acetal units having the general structure

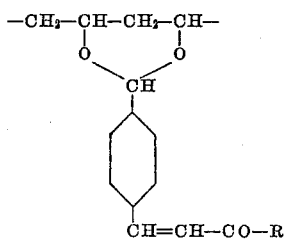

wherein R represents a member of the class consisting of a p-methoxyphenyl group and a hydroxyl group.

Polymers of which the light-sensitive elements are composed are therefore acetals of vinyl alcohol-containing polymers with either a monoterephthalalacetophenone, e. g., monoterephthalal-p-methoxyacetophenone $$(CH_3O-C_6H_4-CO-CH=CH-C_6H_4-CHO)$$

or p-formylcinnamic acid $$(CHO-C_6H_4-CH=CH-COOH)$$

The polymers therefore contain, in addition to recurring vinyl alcohol units recurring vinyl acetal units of the structures

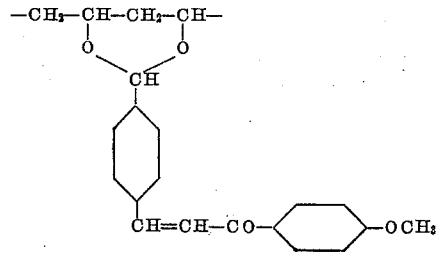

and

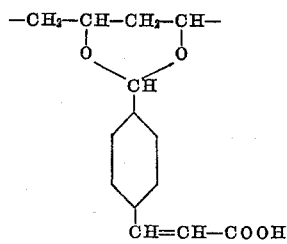

In addition to the recurring vinyl acetal units the polymers can contain other recurring units such as vinyl ester and vinyl alcohol units as will be apparent from the following examples.

The preparation of the polymers of our invention is described in detail in the examples hereinafter.

*Example I*

A solution containing 10.5 g. of polyvinyl acetate and 5.0 g. of monoterephthalal-p-methoxyacetophenone in 40 g. of methanol was treated with a solution of 3.0 ml. of concentrated hydrochloric acid in 10 ml. of methanol with vigorous stirring. The resultant clear dope was kept at 50° C. for 18 hours, then cooled, and the gel which had formed, ground and washed with methanol. The product was purified by solution in hot dimethyl formamide and precipitation in ethanol. Yield 9.5 g.

In a similar manner, the procedure was repeated using 3.0 grams and 1.0 gram respectively of the aldehyde instead of 5.0 grams. Analysis of the three samples of polymers showed that they contained respectively 3.7, 2.4 and 1.0 percent of methoxyl which was equivalent to 8.0 mol percent, 4.4 mol percent and 1.5 mol percent respectively of the recurring vinyl acetal units, the balance of the recurring units in the polymer being principally vinyl alcohol. In spite of the comparatively low acetal content, all three of the polymers were light-sensitive in the respect that they were capable of being insolubilized upon exposure to actinic radiation.

The light sensitivity of the polymers and their applicability to the preparation of printing plates in photomechanical processes was demonsatrated as follows: A commercial lithographic paper base having a hydrophilic surface was coated with a hot ethyl alcohol-water solution (50–50) of the polymer containing 2.4 percent methoxyl. The resulting coating was exposed under a graduated density original until the coating had become insolubilized in the regions of greatest exposure. The coating was then developed with hot water to leave an insoluble polymeric relief image of varying thickness on the lithographic surface from which the light sensitivity (speed) of the polymer was calculated to be 440. It was found that the insoluble resist image thus obtained could be inked with conventional lithographic printing inks and prints obtained therefrom on a lithographic press.

In a similar manner the polymer containing 1.0 percent of methoxyl was coated from solution of equal parts of dioxan and water and the speed value of the polymer estimated to be 60. When a similar coating containing 10 percent by weight of the polymer present of the sensitizing agent 1-methyl-2-benzoylmethylene-$\beta$-naphthothiazoline was processed as described, a speed value of 75 was obtained under the same conditions. On the same scale, bichromated colloid systems have speed values of about 50 to 100.

As will be apparent, one advantage of the polymers prepared above and the polymers described hereinafter is their adaptability to development with water or aqueous solvent mixtures in contrast to known lithographic processes requiring the use of more expensive pure solvent developers.

*Example II*

The p-formylcinnamic acid acetal of polyvinyl alcohol can be prepared as follows:

A mixture of 35 g. of a 30% dope of polyvinyl acetate in methanol, 1 g. of p-formylcinnamic acid, and 3 ml. of concentrated hydrochloric acid in 30 ml. of methanol was immersed in a 50° water bath for 23 hours with occasional shaking. At the end of the reaction period, a white, tough gel was obtained. This was ground up and dissolved in a 3:2 mixture of water and ethyl alcohol. The polymer was reprecipitated in ethanol and air dried.

The utility of the resultant polymer in the preparation of a lithographic paper printing plate was demonstrated by coating a 2 percent ethyl alcohol solution of the polymer on a hydrophilic lithographic printing base, exposing the coating to a sun lamp under a stencil and developing the coating with aqueous alcohol (3 parts of water to 2 of ethyl alcohol) until an image of insoluble polymer was obtained on the hydrophilic surface. The image was capable of being inked and printed in a lithographic printing press.

If desired, aqueous alkali solution may be used for the development of the exposed layer of this polymer followed by neutralizing the resultant resist image with dilute acid.

Polymerized vinyl acetals can also be made in the manner of the above examples by reaction of 150 grams of polyvinyl acetate in acid methanol solution in the presence of either 35 cc. or 65 cc. of cinnamoylaminoacetal $C_6H_5CH=CHCONHCH_2CH(OC_2H_5)_2$ to yield alcohol-soluble polymers which are light-sensitive and can be used for lithographic purposes as described above.

An improvement in the inking properties of the polymers of Examples I and II can be effected by esterification of the residual vinyl alcohol units of the polymers using anhydrides or acid halides particularly of the lower aliphatic acid series such as acetic anhydride. Of course, the resultant vinyl acetate-vinyl acetal copolymers then become insoluble in water and their exposed coatings are developed with organic solvents substantially free of water. Such polymers are prepared as in the following example.

*Example III*

To a solution of 1.5 grams of a monoterephthalal-p-methoxyacetophenone acetal of polyvinyl alcohol (methoxyl content 2.4%) in 15 ml. of dimethylformamide heated in an oil bath at 160° was added while stirring a solution of 7.0 grams acetic anhydride in 10 ml. of dimethyl formamide. After heating and stirring for 15 minutes, the solution was poured into a large volume of hot water, and the white, rubbery precipitate was redissolved in acetone. The solution was again poured into a large volume of agitated water and the polymer dried at 40° C.

A methyl ethyl ketone solution (2%) of this polymer was coated on Duplimat paper and the coating exposed under a photographic negative using an ultraviolet light source. After development of the exposed coating in methyl ethyl ketone, an ink-receptive image was formed which corresponded to that on the negative.

The acetal content of the polymers of the invention naturally can be increased by use in the reaction mixtures of more aldehyde than indicated in the above examples, in which case water solubility of the polymers disappears and the polymers become soluble in organic solvents. Coatings of such polymers are then exposed in the usual manner under the desired image such as a line or halftone subject, followed by development of the resist image on the desired surface using an organic solvent.

The utility of the polyvinyl acetals of the present invention is similar to that of the polyvinyl cinnamate polymers and compositions thereof described, for example, in the Minsk et al. U. S. Patents 2,610,120, 2,670,285-7 and 2,690,966 as well as of the cinnamoylated polystyrene polymers disclosed in the Allen et al. U. S. Patent 2,566,302 and the ar-vinylacetophenone polymers of the Unruh et al. U. S. Patent applications Serial Nos. 246,516-8, filed September 13, 1951. For example, silk-screen stencils can readily be prepared using the above polymers by merely coating the polymers on a silk screen in the conventional manner, exposing the sensitized screen under a carbon arc or equivalent light source and dissolving away the unexposed areas of polymer coating from the screen with a suitable solvent such as a mixture of xylene and glycol monomethyl ether acetate for the solvent-soluble polymers, or aqueous solvent or water for the polymers of the present invention. The resultant screens can be used for stencil printing in a well-known manner. Another use for all of the mentioned light-sensitive polymers is in the preparation of resist images on metal surfaces which are to be etched for the preparation of photo-engraving elements, printed electrical circuits, etc. Also, the polymers can be exposed and developed as described to form resist images on the various surfaces which are well suited to use as sandblast resists.

The polymers are also well adapted as carriers for pigments or dyes for decorative purposes, for preparing monochrome or polychrome images or for preparing electrical-conducting or fluorescent designs. In these cases, the desired ingredient is incorporated into the light-sensitive polymer composition and the coatings thereof exposed and developed to yield insoluble images containing the ingredient on any desired surface such as wood, metal, paper, glass, cloth, natural and synthetic polymers, etc.

Those polymers mentioned which are hydrophobic are useful as dielectrics for insulating purposes and can be used for such properties in well-known electrostatic printing processes. The polymers are also useful in the solvent transfer process of the Murray U. S. Patent application Serial No. 400,247, filed December 24, 1953.

The polymers are likewise well suited to the preparation of radiation-resistant designs on surfaces such as glass. For example, a photosensitive glass prepared as described in U. S. Patent 2,515,275 containing a sensitizing component such as copper, cerium or antimony oxides, gold or silver, can be coated with one of the mentioned light-sensitive polymers, exposed and developed as described with solvent, and the resultant insoluble polymer image on the glass may be colored as desired to exclude the required wave length of light to which the glass is sensitive. Exposure of the glass through the colored design yields the desired image in the glass. Other uses for the polymers wherever it is desired to employ a chemical, physical or radiation-resistant image will occur to those skilled in the art.

A similar polymer, a cinnamic aldehyde partial acetal of polyvinyl alcohol made by reaction of polyvinyl alcohol with cinnamic aldehyde in the presence of sulfuric acid catalyst, was found to be appreciably less sensitive to light than the polymers of the present invention. The higher light-sensitivity of the polymers of the invention has been ascribed to the presence in the latter polymers of the conjugated cinnamoyl group not present in the cinnamal groups of the cinamic aldehyde acetal of polyvinyl alcohol. Accordingly, the polymer has limited utility in the above-mentioned photomechanical processes.

What we claim is:

1. A light-sensitive photographic element comprising a support carrying a layer of a polymer of the class consisting of a polyvinyl acetal consisting of recurring vinyl alcohol units and recurring vinyl acetal units having the general structure

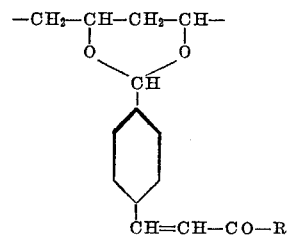

wherein R represents a member of the class consisting of p-methoxyphenyl and hydroxyl groups, and a polyvinyl acetal consisting of said recurring vinyl acetal units and recurring vinyl acetate units.

2. A light-sensitive photographic element comprising a support carrying a layer of a polyvinyl acetal consisting of recurring vinyl acetate units and recurring vinyl acetal units having the general structure

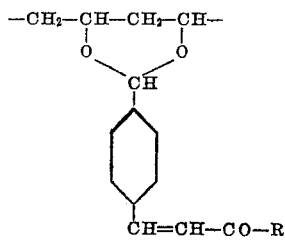

wherein R represents a member of the class consisting of p-methoxyphenyl and hydroxyl groups.

3. A light-sensitive photographic element comprising a support carrying a layer of a polyvinyl acetal consisting of recurring vinyl alcohol units and recurring vinyl acetal units having the general structure

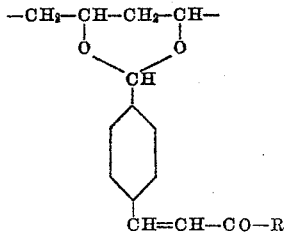

wherein R represents a member of the class consisting of p-methoxyphenyl and hydroxyl groups.

4. A light-sensitive photographic element comprising a support carrying a layer of a polyvinyl acetal consisting of recurring vinyl alcohol units and recurring vinyl acetal units having the structure

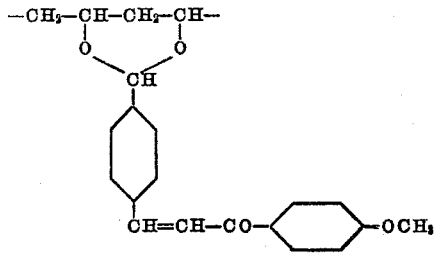

5. A light-sensitive photographic element comprising a support carrying a layer of a polyvinyl acetal consisting of recurring vinyl alcohol units and recurring vinyl acetal units having the structure

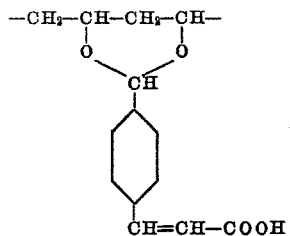

References Cited in the file of this patent
UNITED STATES PATENTS

| | | |
|---|---|---|
| 2,363,297 | D'Alelio | Nov. 21, 1944 |
| 2,422,259 | Pratt | June 17, 1947 |
| 2,610,120 | Minsk et al. | Sept. 9, 1952 |